United States Patent
Elhossini et al.

(10) Patent No.: US 12,322,085 B2
(45) Date of Patent: Jun. 3, 2025

(54) METHOD AND SYSTEM FOR INSPECTING A SURFACE WITH ARTIFICIAL INTELLIGENCE ASSIST

(71) Applicant: VIRTEK VISION INTERNATIONAL INC, Waterloo (CA)

(72) Inventors: Ahmed Elhossini, Waterloo (CA); David Paul Smith, Kitchener (CA); Mehrdad Bakhtiari, Kitchener (CA)

(73) Assignee: VIRTEK VISION INTERNATIONAL INC., Waterloo (CA)

( * ) Notice: Subject to any disclaimer, the term of this patent is extended or adjusted under 35 U.S.C. 154(b) by 159 days.

(21) Appl. No.: 18/133,739

(22) Filed: Apr. 12, 2023

(65) Prior Publication Data
US 2023/0334653 A1    Oct. 19, 2023

Related U.S. Application Data

(63) Continuation-in-part of application No. 18/087,250, filed on Dec. 22, 2022.

(60) Provisional application No. 63/331,064, filed on Apr. 14, 2022.

(51) Int. Cl.
   *G01B 11/30* (2006.01)
   *G06T 7/00* (2017.01)
   *G06T 7/73* (2017.01)

(52) U.S. Cl.
   CPC .............. *G06T 7/001* (2013.01); *G06T 7/73* (2017.01); *G06T 2207/20081* (2013.01); *G06T 2207/20084* (2013.01); *G06T 2207/20212* (2013.01); *G06T 2207/30161* (2013.01); *G06T 2207/30164* (2013.01)

(58) Field of Classification Search
   CPC ......... G01N 21/956; G01N 2021/8883; G01B 11/2518; G01B 11/303; G06T 7/0004; G06T 2207/20081; G06T 2207/20084; G06T 2207/30164; G06T 2207/20132; G06T 7/11
   USPC .................. 365/446; 356/338, 402, 601–625
   See application file for complete search history.

(56) References Cited

U.S. PATENT DOCUMENTS

| | | | |
|---|---|---|---|
| 8,150,105 B2 * | 4/2012 | Mian | ........................ G01V 5/22 382/104 |
| 9,200,899 B2 | 12/2015 | Rueb | |
| 10,799,998 B2 | 10/2020 | Rueb | |

(Continued)

*Primary Examiner* — Isiaka O Akanbi
(74) *Attorney, Agent, or Firm* — Miller, Canfield, Paddock

(57) ABSTRACT

A system for identifying accurate assembly of a component to a workpiece is disclosed. The system includes a light source for projecting light indicia onto the component assembled to the workpiece. A controller includes an artificial intelligence (AI) element defining a machine learning model that establishes a convoluted neural network trained by stored images of light indicia projected onto the component assembled to the workpiece. An imager includes an image sensor system for imaging the workpiece and signaling a current image of the workpiece to the controller. The machine learning model directs inspection of the workpiece to the light indicia imaged by said imager. The AI element determines disposition of the component disposed upon the workpiece through the neural network identifying distortions of the light indicia in the current image.

15 Claims, 3 Drawing Sheets

(56) References Cited

U.S. PATENT DOCUMENTS

| | | | |
|---|---|---|---|
| 2009/0140887 A1* | 6/2009 | Breed | G01C 21/1656 |
| | | | 701/116 |
| 2020/0020112 A1* | 1/2020 | Buibas | G01G 19/4144 |
| 2020/0202177 A1* | 6/2020 | Buibas | G06V 10/764 |
| 2022/0122157 A1* | 4/2022 | Ross | G06V 20/20 |

* cited by examiner

METHOD AND SYSTEM FOR INSPECTING A SURFACE WITH ARTIFICIAL INTELLIGENCE ASSIST

PRIOR APPLICATIONS

The present application claims priority to U.S. Provisional Patent Application No. 63/331,064 filed on Apr. 14, 2022, and to U.S. patent application Ser. No. 18/087,250 filed on Dec. 22, 2022 that also claims priority to U.S. Provisional Patent Application No. 63/331,064.

TECHNICAL FIELD

The present invention relates generally towards automated inspection of surfaces. More specifically, the present invention relates towards the use of artificial intelligence for inspection of surfaces using laser projected indicia to improve efficiency.

BACKGROUND

Inspection of mass production components is increasingly important to meet and maintain high quality manufacturing standards. Early inspection processes used in mass production facilities made use of periodic human inspection to achieve modest improvements in quality production. Statistical process controls assisted with this effort. However, poor efficiency and human error has made these efforts inadequate to meet modern quality standards. To meet these ever-increasing quality standards higher percentages of production must be inspected in many instances rendering the use of human inspection mostly obsolete. Therefore, efforts have been made to implement machine vision inspection using cameras and sensors to inspect whether a component has been properly assembled to a work surface. However, this inspection scheme fails when the assembly is quite large, such as, for example, when the assembly is a prefabricated construction, a building component such as a truss, large aerospace members, wind turbine blades and the like. Additionally, it becomes difficult to inspect moderately sized surfaces when assembly rates are very high and only small areas of interest require inspection.

In some instances, artificial intelligence ("AI") has been implemented with moderate success. In these systems, computer vision algorithms such as template matching, feature extraction and matching combined with Machine Learning ("ML") algorithms have been implemented. More recently, Deep-Learning ("DL") and neural networks have been identified as feasible for AI inspection due to the implementation of learning-based algorithms. Learning based DL neural networks such as Convolutional Neural Networks ("CNN") is an example of such algorithms. These CNN's can be trained to learn from images of a template to generate a machine learning model used to inspect assembled components. It is thought that ever increasing accuracy may be achieved through machine learning.

CNN's using sophisticated algorithms can approach human logic and accuracy. These CNN's can be trained to detect anomalies in the images of the parts under inspection by using the AI model that is trained from stored images and the like as is known to those of ordinary skill in the art. However, the computation cost for such CNN algorithms limits their ability to process larger images of very large objects on industrial scales. Even training such AI models to inspect small objects is problematic when included within a large, detected image or high-volume manufacturing processes.

Therefore, it would be desirable to develop an AI model for industrial inspection that would be economically feasible and provide efficiency in mass production settings not previously achieved.

SUMMARY

A system for identifying accurate assembly of a component to a workpiece is disclosed. The system includes a light source for projecting light indicia onto the component assembled to the workpiece. A controller includes an artificial intelligence (AI) element defining a machine learning model that establishes a convoluted neural network trained by stored images of light indicia projected onto the component assembled to the workpiece. An imager includes an image sensor system for imaging the workpiece and signaling a current image of the workpiece to the controller. The machine learning model directs inspection of the workpiece to the light indicia imaged by said imager. The AI element determines disposition of the component disposed upon the workpiece through the neural network identifying distortions of the light indicia in the current image.

The use of strategically projected laser indicia upon an inspection surface provides the ability to reduce complexity of code and analysis by way of CNN or any other AI model. Illumination of an area of illumination of with light indicia, such as, for example laser indicia is easily identified by an imager, or more specifically a camera or plurality of cameras. Making use of a pixelated sensor enables a controller to conduct CNN algorithms that are significantly simplified when compared to a similar algorithm required to inspect an entirety of the inspection surface. Once imaged, the controller conducts CNN analysis to determine if distortions of the light indicia are indicative of improper installation of the component to the workpiece. It is also possible for the controller to analyze only the laser indicia when processing the CNN or any other AI model. The inventive process of the present application even eliminates reliance upon comparing computer aided design (CAD) data for the purpose of determining accurate assembly of a component when performing inspection analysis further reducing complexity of the computer code and increasing speed of the inspection. CAD data is used to accurately locate the area of interest on an inspection surface when registering spatial location of the laser projector with the inspection surface. Once the light source and laser projector have been spatially located relative to the inspection surface by way of conventional laser projection processes the CAD data need not be further involved in the inspection process because the AI algorithms are used for the inspection analysis. This dual system of CAD directed laser projection and AI inspection improves accuracy of inspection while also increasing inspection efficiency. Therefore, the combination of AI and laser projection enables a broad implementation of the benefits of each system for machine inspection not previously thought achievable.

BRIEF DESCRIPTION OF THE DRAWINGS

Other advantages of the present invention will be readily appreciated, as the same becomes better understood by reference to the following detailed description when considered in connection with the accompanying drawings, where in.

DETAILED DESCRIPTION

Figure 1:
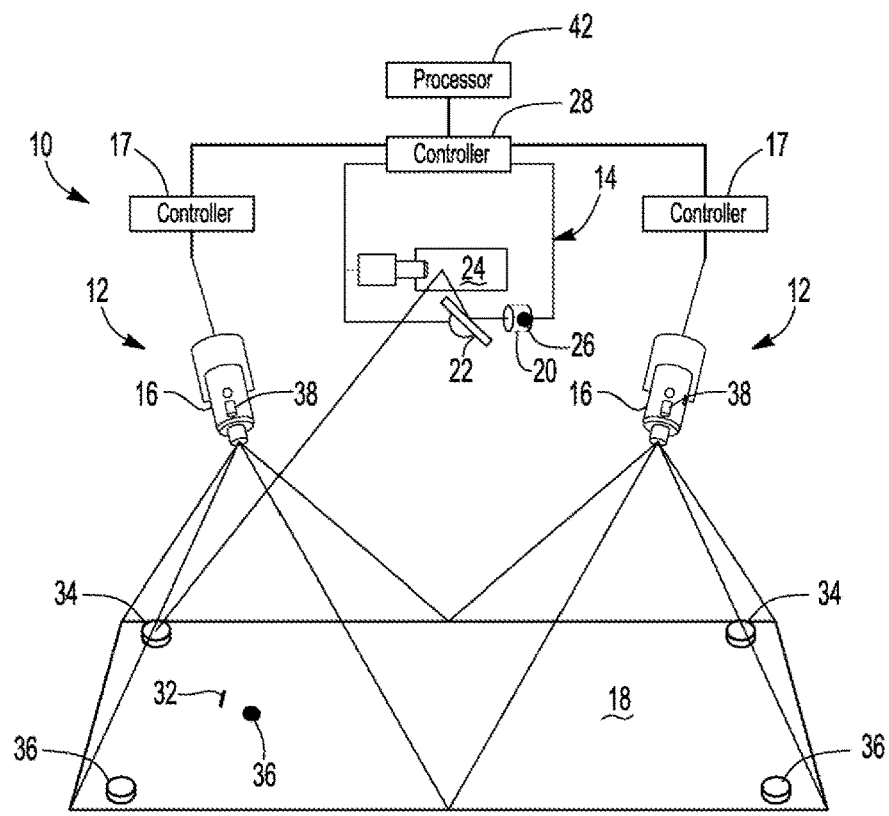
FIG. 1 shows a schematic of the inspection system of the present invention spatially locating the laser projector with the inspection surface.

Referring to FIG. 1, a system of the present invention is generally shown at 10. The system 10 includes an imager 12 and a laser projector 14. The imager is made-up of one or more cameras 16. The number of cameras 16 included in any system 10 is dependent upon an area of an inspection surface 18 upon which some work has been performed. It is desirable that a view of the entire inspection surface 18 is achieved by the cameras 16, the purpose of which will become more evident hereinbelow. Therefore, the use of several cameras 16 are desirable to cover very large inspection surfaces 18 while fewer cameras 16 may be required for smaller inspection surfaces 18. While the Figures of the present application represent two cameras 16 it should be understood a single camera 16, or two, three, or more cameras 16 may be used as desired. In any event, the cameras present a full view of the inspection surface 18 so that no gaps in the view exist. In one embodiment, each camera 16 includes a camera controller 17. However, it should be understood that a central controller that is electronically connected with each of the cameras 16 by way of hardwire or other wireless transmission is also within the scope of this invention.

The laser projector 14 is a conventional projector that includes a laser 20 and a cooperate first galvo mirror 22 and second galvo mirror 24. A suitable laser projector 14 is IRIS 3D laser projector provided by Virtek Vision International, Inc. The laser projector 14 includes a laser sensor 26 for detecting a return laser beam as is explained further in U.S. Pat. No. 9,200,899 LASER PROJECTION SYSTEM AND METHOD the contents of which are included herein by reference. A laser controller 28 calculates location and direction of the laser projection based upon rotational orientation of the first galvo mirror 22 and second galvo mirror 24 in a known manner.

The laser controller 28 conducts a locating sequence to spatially locate the inspection surface 18 relative to the laser projector 14. More specifically, the laser projector 14 is located within a three-dimensional coordinate system relative to the inspection surface 18 enabling the laser projector 14 to project laser indicia 30 (FIG. 2) in the form of a boundary 31 (or boundary box) onto the inspection surface 18 at area of interest 32 also defined within the three-dimensional coordinate system.

To locate the laser projector 14 relative to the inspection surface 18, reflective targets 34 are affixed to the inspection surface 18 at predetermined datums defined in the CAD data. As known to those of ordinary skill in the art, accurately locating the datums in a three-dimensional coordinate system enables accurate location of the inspection surface 18. As such the laser projector 14 projects a laser beam 36 to the reflective targets 34 from which a return laser beam is reflected to the laser sensor 26. Based upon the orientation of the galvo mirrors 22, 24 locations of the targets 34 are calculated by the controller 28 in a known manner. The process of establishing correlation between the laser projector 14 in the inspection surface 18 is explained further in U.S. Pat. No. 9,200,899 LASER PROJECTION SYSTEM AND METHOD wherein alternative calibration methods are explained including projecting arbitrary laser spots into the work environment are included herein by reference. The system 10 may also rely on photogrammetry techniques using the cameras 16 or other cameras integrated with the laser projector 14 to identify location of the laser spots. In either embodiment, a location of the cameras relative to the laser projector is calibrated. Rapid methods for aligning the laser projector 14 with the inspection surface 18 is disclosed in U.S. Pat. No. 10,799,998 LASER PROJECTION WITH FLASH ALIGNMENT, the contents of which are also included hearing by reference.

Therefore, it should be understood to those of ordinary skill in the art that it is desirable to locate each camera 16 relative to the laser projector 14 within the three-dimensional coordinate system either by locating techniques explained herein above or affixing each camera 16 to the laser projector spaced by a known amount. Therefore, the cameras 16, the laser projector 14 and the inspection surface 18 are all now located relative to each other within a common three-dimensional coordinate system. Once located, the controllers 17, 28 may begin performing a locating sequence to identify an area of interest 32 on the inspection surface 18.

The following is an explanation of a first of a sequence of assembly tasks that may include mating a component 36, or a plurality of components 36 to an inspection surface 36 to form a fully assembled workpiece. In one embodiment, the laser projector 14 also projects laser indicia 30 that directs an operator through an assembly sequence by, for example, identifying the location upon the inspection surface 18 whereat the component 36 is to be assembled. Therefore, in one embodiment the laser indicia 30 may function as a template for directing an assembly task. Thus, the laser projector 14 serves dual purposes of directing an assembly operation as well as assisting machine inspection to verify proper assembly. The system 10 and method of the present invention is also contemplated for use to identify location of defects on the inspection surface 18 such as, for example, paint defects and other surface defects. In this embodiment, once a vision detection system identifies a defect, the laser projector 20 is signaled a location of the defect and projects a location identifying laser indicia to the defect.

Once the laser indicia 30 is projected onto the inspection surface 18, the imager 12 begins its imaging sequence. Each camera 16 of the imager 12 includes an image sensor 38 such as, for example, a CCD or CMOS sensor that generates pixelated images. These pixelated images hereinafter described as current images are signaled to the camera controller 17. In one embodiment, the camera controller 17 implements machine learning algorithms that are trained by way of stored images. The stored images include a database of pixilated images of the laser indicia 30 that is continuously updated with current images that are dissimilar to those stored images already populating the database. Therefore, the training is continuously updated by enhancing a database of stored images with current images to improve the inspection accuracy. To facilitate training the camera controller 17, the camera controller 17 identifies when a current image does not properly correspond to its machine learning model and signals the current image to a remote processor 42 as will be explained further herein below.

Again, referring to FIG. 2, the laser controller 28 both locates an area of interest 32 and identifies the area of interest by projecting the boundary 31 onto the inspection surface 18. Thus, a predetermined area of the boundary 31 is generated by the laser beam 34 generating a circumscribing laser pattern onto the inspection surface 18. It should be understood that the component 36 is necessarily located within the boundary 31. This step of the machine inspection procedure is directed by way of a General Dimensional and Tolerance (GD&T) scheme record of CAD data and not by tracking placement of the component 36. Thus, while the CAD data is not necessary for the inspection process, the CAD data is used to assist identification of the location of the areas of interest 32 on the inspection surface 18.

Machine Learning by way of CNN architectures have been thought to be adequate for industrial inspection to verify if a component 36 has been installed in a correct position, i.e., within specified GD&T tolerance. Most of these CNN architectures are trained and evaluated to detect normal objects such as people, cars, trees, and animals. These CNN architectures are feasible when object size within the image the architecture is trained on is large enough to have good features to detect. However, if the object is small, or the image size is large including many small objects within the image, the majority of existing CNN architectures fail. To avoid increasing architecture complexity or adding additional training data to cover small object sizes, none of which are practicable, the system 10 of the present invention is trained to focus only on an area within the boundary 31 within a larger worksurface or inspection surface 18. It is desirable that the areas be as small as possible relative to the object being inspected.

Figure 2:
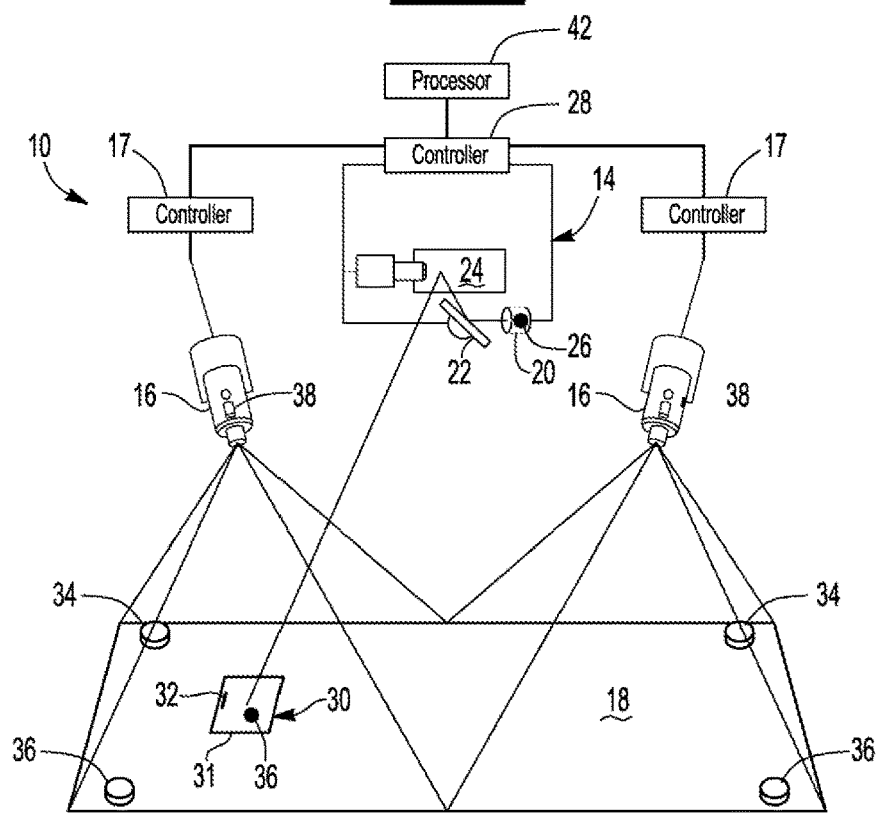
FIG. 2 shows a schematic of the inspection system of the present invention with the laser projector projecting laser indicia to an area of interest upon the inspection surface.

As best represented in FIG. 2, the laser projector 14 projects the boundary 31 onto the inspection surface 18 at a location that is within a field of view of any of the cameras 16. The laser controller 28 is programmed to direct the laser projector 14, or laser projectors 14 as a process may require, to identify multiple areas of interest 32 by projecting a boundary 31 to each area of interest 32. The CNN architecture of the controller 38 is trained to detect the boundary 31 within the current image generated by the imager 12 and signaled to the camera controller 17. Once the CNN architecture identifies the boundary 31 generated by the laser beam 34, the camera controller 17 extracts only that portion of the image where the boundary 31 is detected. By performing this extraction process, the CNN algorithm need only be run on that portion of the image within the boundary 31 where the component 36 is expected to exist.

Therefore, the CNN model does not need to be trained to analyze large images that require tabulation of large volumes of pixels generated by the image sensor 38. By the laser projector 14 directing the camera controller 17 to the area of interest 32 with the laser generated boundary 31, the CNN model is easily trained on a small number of pixels within the current image of the inspection surface 18 as defined by the boundary 31. Therefore, the computational complexity is substantially reduced over images of an entire inspection surface generated by large size imaging systems. Due to the precise nature of a laser projected boundary 31 enabling the creation of a localized image limited to a precisely defined area of interest 32, the CNN computation is anticipated to also be highly accurate.

In one embodiment, image processing is conducted in two steps. First, a background image is generated of the inspection surface 18 by the imager 12 prior to projection of the boundary 31 by the laser projector 14. Next, the laser projector 14 scans the boundary 31 onto the area of interest 32. While the boundary 31 is projected onto the area of interest 32, the imager generates a current image of the inspection surface 18 from which the laser boundary 31 is clearly delineated by subtracting pixels generated in the background image from pixels generated in the current image. Thus, by way of pixel subtraction between the two images, the camera controller 17 is capable of identifying with a high degree of accuracy the laser boundary 31. The location at which the pixels are detected being significantly changed between the background image and the current image enables the controller 17 to select the area within the laser boundary 31 for CNN inspection. Thus, only those pixels generated on the current image are analyzed because the pixels of the background image are subtracted and therefore not analyzed. This process increases accuracy of identifying the area of interest.

By way of laser projection assisted artificial intelligence, the CNN algorithm and model selected for the analysis by the camera controller 17 includes the following features:
  Object Classification: Does the object exist or not exist within the boundary 31.
  Object Measurement: Does the object of correct size, and placed in the correct location?
  Template Matching: Does the object match a given template?

Features of the artificial intelligence model are selected depending on a given application. Specifically, it is desirable to train the CNN algorithm to analyze only that portion of the image of the inspection surface 18 that includes objects that are of interest while ignoring objects not of interest. This is achievable by projecting the laser scanned boundary 31 without requiring highly complex and expensive imaging systems. The attempts to analyze an image of a whole inspection surface that requires unneeded algorithm complexity and computing power is now eliminated.

Once the area of interest 32 has been identified from the boundary 31 scanned by the laser projector 14 the laser controller 28 modifies the scanning pattern of the laser beam 34 to more closely identify where the component 36 is expected to be placed by scanning a template 40 onto the inspection surface 18. The size and shape of the template 40 is established by predetermined tolerances related to placement of the component 40 on the inspection surface 18. Thus, the laser projected template 40 may be used to identify proper placement of the component 36 up on the inspection surface 18. In one embodiment, the laser projected template 40 may circumscribe a plurality of components 36. Thus, the camera controller 17 is able to evaluate pixels received from the camera sensors 38 when generating the current image to confirm components 36 exist within the area of interest 32. Once the current image is generated, the CNN process is begun by using the trained models received from the remote processor 42 focusing the analysis on the area of interest 30 as defined by the laser generated indicia 30.

As described above, a database that stores pixelated images from which the machine learning model is built is located on the processor 42 that is separate from the controllers 17, 28 that manage the machine inspection of the inspection surface 18. Using a remote processor 42 reduces the burden of memory space and processing on the controllers 17, 28 that run the CNN algorithm. However, it should be understood that the database on the processor 42 is continuously updated using appropriate learning mechanisms to include additional images showing alternative dispositions of the component 36 when placed on the inspection surface 18. The processor 42 signals the controllers 17, 28 the updated training algorithms enabling the CNN algorithm and models operating the controllers 17, 28 to improve proficiency in identifying disposition of the area of interest 32 within the boundary box 31. Thus, the system 10 may now focus on inspection of merely the area of interest 32 without the burden of imaging the entire inspection surface 18.

Figure 3:
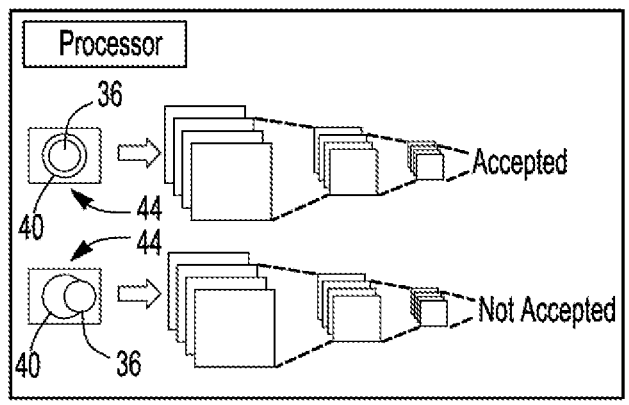
FIG. 3 shows a flow chart of the CNN process at the controller level of the inspection system.

Referring to FIG. 3, and as represented above, the boundary 31 is recognized by way of the current image 44 generated by the imager 12 limiting inspection to the area disposed within the boundary 31. Thus, the imager 12 detects both the existence of a component 36 within the boundary 31 defined by the laser beam and the boundary 31 itself. As is known to those of skill in the art, CNN is a feed-forward neural network. One type of feed forward network is known as a Residual Network or RESNET often requiring at least one hundred and sometime over one thousand processing layers to achieve desired accuracy when CNN is used for visual identification. The power of a CNN comes from a special kind of layer called the convolutional layer. Convolutional neural networks contain many convolutional layers stacked on top of each other, each one being capable of recognizing more sophisticated shapes, and in some instance continually narrowing scope of pixels from a camera image. The projected boundary 31 of the present invention eliminates most of these layers by reducing the broad view low resolution data and focusing only on those convolution layers relevant to the area of interest 32 disposed within the boundary 31. Therefore, where dozens of layers may be required for large image analysis, the invention of the present application requires only thirty or less convolution layers resulting in reduced complexity of the CNN algorithm and requiring less time to complete analysis of an image Subsequently, the CNN algorithm includes analysis of the boundary 31 to measure the component 36 using the training that is updated when the current image is integrated with the stored images disposed on the processor 42. Furthermore, the laser projector 14 traces the template 40 identifying anticipated location of the component 36 within the boundary 31 providing additional accuracy for identifying a location for machine inspection.

Calibration of the imager 12 relative to the laser projector 14 and to the inspection surface 18 is relevant for obtaining desired accuracy of the machine inspection. As a result of calibration, the controllers 17, 28 calculate relative location of the laser projector 14 or plurality projectors 14, the imager 12 and a work surface 18 within a common three-dimensional coordinate system. In addition, calibration of the imager 12 and each of the associated cameras 16 include laser sensor 26 and camera sensor 38 parameters relative to desired image resolution so that pixels contained in an image of the inspection surface 18 provide necessary accuracy. Parameters of the camera lens included with each camera 16 are also established during system 10 calibration. Specifically, focal length in pixels, and optical center of pixels, and other distortion parameters that depend upon device model are necessarily established during calibration.

The location of the imager 12 and each associated camera 16 is determined in a three-dimensional coordinate system using image capturing process converting three-dimensional calibration to a two-dimensional image system from which the image controller 17 conducts its measurement analysis. Therefore, the image capturing process removes the depth dimension for CNN analysis. To achieve this end, exact positioning of the imager 12 within the three-dimensional coordinate system is determined using conventional metrology techniques. Actual size of the component 36 being measured is also determined at this time.

Alternative methods may be used to identify the location of each of the cameras 16 within the common coordinate system relative to the inspection surface. One method includes collecting measurements of, for example, the targets 34 placed at known positions within the coordinate system as explained above. April tags or coded targets that include checkerboard or other patterns placed in known coordinates may also be used to identify location of the cameras 16 when an image is generated and signaled to the camera controller 17. Alternatively, the cameras 16 and the laser projector 14 independently identify each location within the common coordinate system by measuring coded targets placed at predetermined geometrically relevant locations in a known manner. Once a sufficient number of targets has been measured, the controllers 17, 28 use a system of equations to identify camera 16 parameters of the imager 12 within the common coordinate system.

The laser projector 14 projecting laser spots to known coordinates may also be used to locate the laser projector 12 within the common coordinate system. Locating these spots with the imager 12 enables the controller 28 to build a 2D/3D point correspondence believed necessary to perform calibration of the cameras 16 defining the imager 12. This method of calibration is particularly useful when a plurality of cameras 16 are utilized to cover an expansive inspection surface 18 so long as the laser projector 14 is able to project a laser spot or laser pattern within a field of view of each of the cameras 16. Otherwise, full coverage of the inspection surface 18 may be achieved by integrating a plurality of laser projectors 14, each ultimately being registered or located relative to the imager 12.

As explained above, the CAD data is used when locating the area of interest 32 and the inspection surface 18 so that the laser projector 14 is able to accurately project the laser indicia 30, and more specifically the boundary box 31 onto the inspection surface. Once the inspection surface 18 has been registered within the common 3D coordinate system, the CAD data is used to direct the laser where to project the indicia. However, once each of the common 3D coordinate system had been registered, the machine inspection is conducted independently of CAD data, reliance of which would slow down the inspection process. Referring again to FIG. 3, the imager 12 generates a pixelated current image of the inspection surface 18 and focuses on the area of interest 32 as directed by the laser generated boundary 31. In one embodiment, the camera controller(s) 17 administers the CNN algorithm implementing the training achieved from the stored images on the processor 42. In this non limiting example, the training is updated periodically when the current image is signaled by at least one of the controllers 17 to the processor 42 and is compared with a database of first stored images 44 providing an indication that the component 36 is disposed in either the design position or not within the design position within the boundary 31. Continuous processing using the CNN algorithm provides increasingly narrow analysis of the current image as trained by the second stored images and third stored images ultimately providing a determination that the component is disposed at a correct location within the boundary 31. The CNN algorithm continuously narrows analysis of the stored images by way of the CNN training with the current image to determine if the current image is accepted by the imaged pixels being within predetermined parameters or not accepted by the imaged pixels being outside predetermined parameters.

The AI model is continually improved relative to accuracy of the comparative analysis through machine learning by updating the database disposed in the processor 42. Therefore, when current images are generated by the imager 12 that do not correspond sufficiently with any of the stored images, the processor 42 updates the CNN database providing improved accuracy to the machine inspection performed by the system 10. For example, when a current image does not match any of the stored images, the current image is classified as identifying an accepted disposition or a not accepted disposition. Disposition is determined by conformance to a preestablished tolerance. These steps are optimized by way of the reduced inspection area that is limited to an area of interest 32 as defined by the laser projected indicia 30, and more specifically, the laser projected boundary 31.

Figure 4:
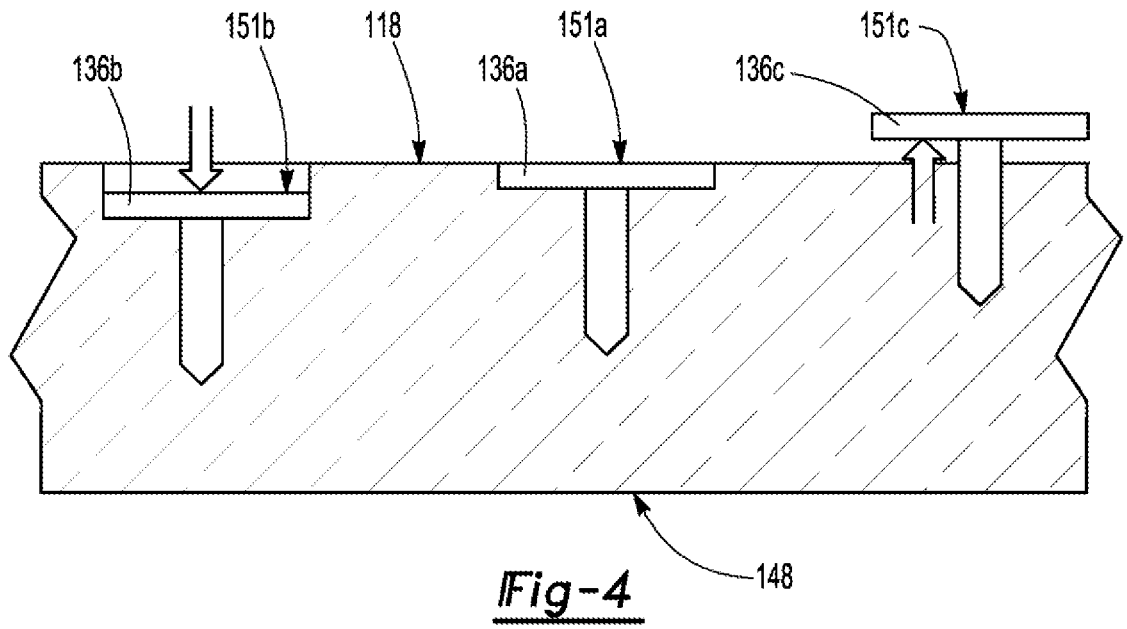
FIG. 4 shows a segmented side view of the surface of a workpiece including fasteners.
Figure 5:
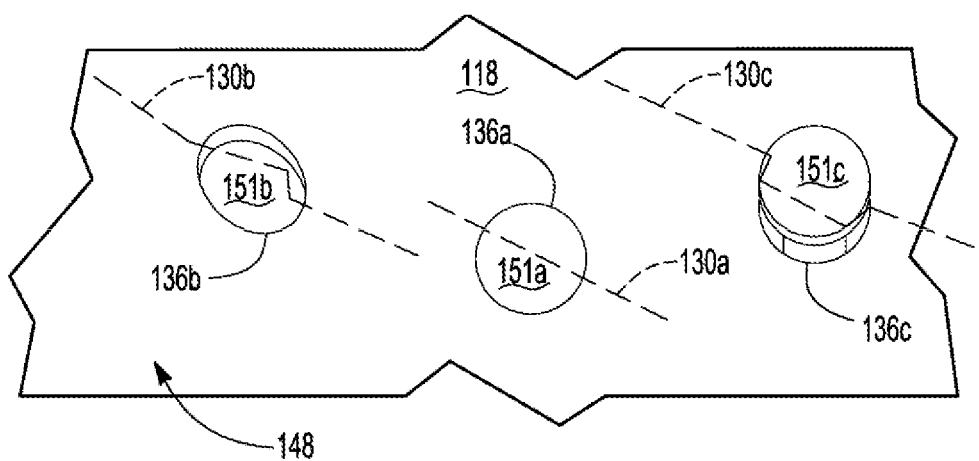
FIG. 5 shows a segmented plan view of the workpiece illustrated in FIG. 4.
Figure 6:
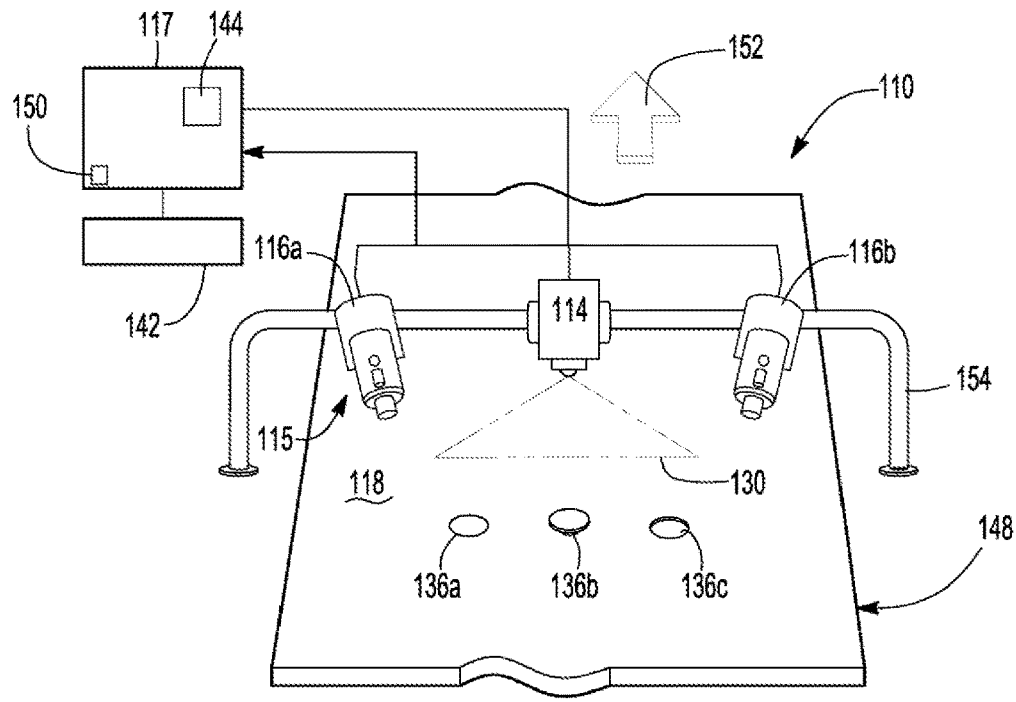
FIG. 6 shows a schematic of an alternative embodiment of the inspection system of the present invention inspecting a surface of a workpiece.

In an alternative embodiment, illustrated in FIGS. 4-6, a system, shown generally at 110 for identifying an accurate assembly of a component 136 to a workpiece 148 includes a controller 117 that having an artificial intelligence (AI) element 150, a laser source 114, and an imager 115, that includes one or more cameras 116, for generating a current image 144 of the workpiece 148 and signaling the current image 144 of the workpiece 148 to the controller 117. It should be understood that the controller 117, and more particularly the AI element 117 operate in a similar manner as does the earlier embodiments by making use of CNN algorithms and Residual Networks.

Referring now to FIGS. 4 and 5, a laser source 114 projects laser indicia 130, in this embodiment a laser line 130, onto an inspection surface 118 of the workpiece 148 onto which components 136 have been affixed. Disposition of the projected laser indicia 130, or laser line, is monitored by the imager 115 and analyzed to determine whether the components 136 that have been attached to the workpiece 148 are properly installed. In this non-limiting example, the workpiece 148 is a piece of wood, for example a board or truss, and the components 136 are fasteners, for example nails. FIG. 4 illustrates a segmented side view of the workpiece 148 including three nails 136a, 136b, 136c that have been attached to the workpiece 148. The first component 136a represents proper installation in which a top surface 151a of the nail 136a is flush with the surface 118 of the workpiece 148. The second component 136b represents improper installation in which the top surface 151b of the nail 136b is below the surface 118 of the workpiece 148. The third component 136c is also not properly installed, but in this case, the top surface 151c of the nail 136c is above the surface 118 of the workpiece 148.

FIG. 5 illustrates a segmented plan view of the workpiece 148 that is representative of a view from the imager 115 showing the three components 136a, 136b, 136c and each corresponding projected laser indicia 130a, 130b, 130c. The laser indicia 130a projected over the first component 136a, which is properly installed presents a straight line. The laser indicia 130b, 130c projected over the second component 136b and the third component 136c, which are both improperly installed present distorted lines. As will be explained further hereinbelow, the imager 115 generates an image of the installed components 136a, 136b, 136c and signals the controller 117 the image from which the laser lines 130a, 130b, 130c are evaluated by the CNN algorithm to determine if proper installation has been achieved. Rather than evaluating the whole image, the CNN algorithm merely evaluates the laser lines 130a, 130b, 130c enabling a reduction in data required for CNN analysis improving efficiency.

FIG. 6 illustrates another embodiment of the system 110 in which the workpiece 148 moves or is conveyed in a longitudinal direction 152 under an overhead railing 154. The laser source 114 and the imager 115, which includes two cooperable cameras 116a, 116b each having a sensor that is part of the sensor system, are mounted to the overhead railing 154. The laser source 114 is positioned between the cooperable cameras 116a, 116b. The laser source 114 projects the laser indicia 130, in this embodiment, a stationary laser line onto the surface 118 of the workpiece 148 while the workpiece 148 moves beneath the overhead railing 154. The cooperable cameras 116a, 116b generate a composite image or current image 144 of the workpiece 148. The cooperable cameras 116a, 116b capture consecutive composite images 144 of the surface 118 of the workpiece 148 including the projected laser line 130. Each captured image 144 is transmitted to and received by the controller 117 for submission through the CNN algorithm 150 to identify disposition of the component 130a, 1306, 130c installation, including improperly or defectively installed components.

After the imager 116 uses its image sensor system 116a, 116b to capture a current image 144 of the workpiece 148 and transmits the current image 144 of the workpiece 148 to the controller 117. As with the earlier embodiments, the controller 114 is populated with a plurality of stored images of the laser indicia projected onto the component assembled to the workpiece. The controller 117 utilizes its AI element 150, that includes the CNN algorithm for comparing the current image 144 of the workpiece 148, including the indicia 130 projected onto the component 148, with the stored images of the laser indicia projected onto the assembled component. The stored images include a database of pixilated images of the laser indicia 130 that is continuously updated with current images that are dissimilar to those stored images already populating the database. Therefore, the training is continuously updated by enhancing a database of stored images with current images to improve the inspection accuracy. To facilitate training the camera controller 117, the camera controller 117 identifies when a current image does not properly correspond to its machine learning model and signals the current image to a remote processor 142.

The AI element 150 determines the disposition of the component 136 that is disposed on the workpiece 148 based upon the results of the CNN algorithm identifying disposition of the laser indicia 130a, 130b, 130c in the current image 144 to laser indicia in the stored images. As with the earlier embodiment, the AI element 150 also makes use of deep-learning algorithms (DL) in combination with CNN to continuously improve accuracy inspection.

The processor 142 includes an update algorithm for adding the current image 144 to the stored images implementing the DL to improve accuracy by learning to more efficiently identify distortions and detect defectively installed components.

More specifically, the imaging system 116 generates pixels of the laser indicia from the current image 144 and the controller 117 executes the CNN to identifying disposition of the component 136 disposed upon the workpiece 148.

Figure 7:
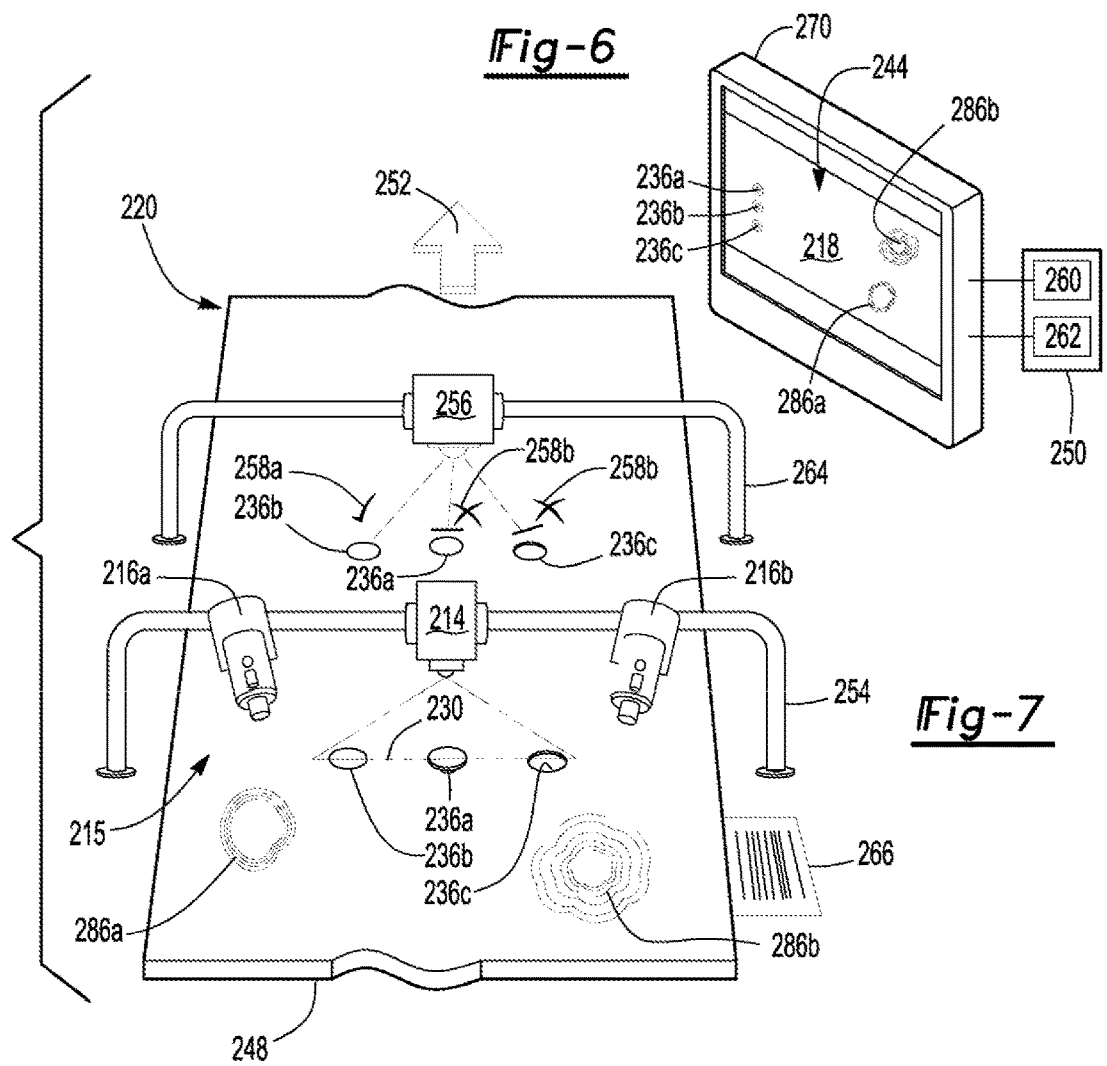
FIG. 7 shows a schematic of a third embodiment of the inspection system of the present invention inspecting a surface of a workpiece.

FIG. 7 illustrates additional aspects of the alternative embodiment, shown generally at 220, that includes a laser projector 256 that projects an icon 258 onto the surface 218 of the workpiece 248 adjacent the component 236 to indicate to an operator whether the component 236 has been properly assembled onto the workpiece 248. This embodiment in the same manner as the earlier described embodiment in which the AI element 250 implements the CNN algorithm 260 to identify disposition of the laser indicia 230 to indicate whether a component 236 has been properly assembled to a workpiece 248. However, this embodiment further executes a registration process by running a registration algorithm 262 to locate the position of the assembled component 236 on the surface 218 of the workpiece 248 relative to the laser projector 256 enabling projection of an icon 258 onto the surface 218 adjacent to the component 236.

In this embodiment, the laser projector 256 is mounted to a second overhead railing 264 that is positioned downstream from the first overhead railing 254. Downstream means that as the workpiece 248 moves in the direction of arrow 252, it passes under the first overhead railing 254 first subsequently passing under the second overhead railing 264. During registration, a reference target 266 is disposed in a fixed position relative to an edge of the workpiece 248 and within the field of view of the imager 216, is imaged to register location of the target 266 to the laser source 214, the imager 216 and the laser projector 256. Therefore, a common coordinate system is determined for all of the elements.

The workpiece 248, which is a piece of plywood in this non-limiting example includes distinctive markings, or wood impurities, 268a, 268b on its surface 218. The cooperable cameras 216a, 216b capture an image 244 of the surface 218 of the workpiece and of the reference target 266, the distinctive markings 268a', 268b', and the attached components 236a', 236b', 236c'. The controller 260 registers the distinctive markings 268a', 268b' to the reference target 266 so that so that orientation of the workpiece 248 is then known relative to the laser source 214, the imager 215 and the laser projector 256. Therefore, through registration of the distinctive markings 268a', 268b' in the common coordinate system, registration of the workpiece 248 in the common coordinate system is maintained, even during movement of the workpiece 248. It should therefore be understood that the components 236a', 236b', 236c' are also now registered in the common coordinate system through correlation with the distinctive markings 268a', 268b'.

After registration algorithm 262 has been performed, the controller 217 knows the location of the component 236 on the surface 218 of the workpiece 248 and the location in the common coordinate system. Therefore, while the workpiece 248 is moving in the direction of arrow 252 the laser projector 256 can accurately project a disposition icon 258 adjacent the component 236.

Through execution of the CNN, the controller 217 determines, if the component 236 is properly installed. When the section of the workpiece containing a properly installed component 236a moves by the laser projector 256, the laser projector 256 projects a first indicator icon 258a, in this case a check mark, "✓" near the properly installed component 236a. If the controller 217 determines that the component 236b, 236c is not properly installed, the icon projector 264 projects a second indicator icon 258b, in this case an "X" mark, near the improperly installed component 236b, 236c. These icons 258 that are projected onto the surface 218 of the workpiece 248 function as automated indicators to operators of the status of the component 236 installation.

In addition to the laser generated icons 258, a display 270 provides additional disposition of the workpiece 248 to the operators. The display 270 identifies via the imaging 215 dictation of the workpiece 248 the distinctive markings 268 and the components 236 via computer generated icons. Thus, the operators have visual verification of disposition of each of the components 236 on the surface 218 of the workpiece 248 and redundant verification via the display 270. Therefore, it should be understood that the CNN provides the ability to both locate components and verify accurate installation of the components onto a workpiece. For simplicity, what panels were used in an exemplary manner. However, it should be understood that the system of the present invention maybe used for inspection of any surfaces of any workpiece to verify proper installation of any type of component and continuous improvement of the inspection is achieved through DL.

The invention has been described in an illustrative manner; many modifications and variations of the present invention are possible. Is therefore to be understood within the specification the reference numerals are merely for convenience and are not to be in any way limiting, and that the invention may be practiced otherwise then is specifically described. Therefore, the invention can be practiced otherwise then is specifically described within the scope of the stated claims following the aforementioned disclosed embodiment.

What is claimed is:

1. A system for identifying accurate assembly of a component to a workpiece, comprising:
   a light source for projecting light indicia onto the component assembled to the workpiece;
   a controller including an artificial intelligence (AI) element including a machine learning model that establishes a convoluted neural network trained by stored images of light indicia projected onto the component assembled to the workpiece;
   an imager including an image sensor system for imaging the workpiece and signaling a current image of the workpiece to said controller;
   said machine learning model directing inspection of the workpiece to the light indicia imaged by said imager; and
   said AI element determining disposition of the component disposed upon the workpiece through said neural network identifying distortions of the light indicia in the current image.

2. The system set forth in claim 1, wherein said AI element includes deep-learning algorithms (DL) in combination with said CNN.

3. The system set forth in claim 1, further including a processor for generating a database populated with said stored images.

4. The system set forth in claim 1, wherein said machine learning model is trained by stored images of the light indicia projected onto the component thereby enabling said AI element to improve accuracy of the inspection.

5. The system set forth in claim 1, wherein said imager includes a plurality of cameras each including a sensor that is part of said image sensor system.

6. The system set forth in claim 5, wherein said plurality of cameras generate a composite image of the workpiece and components attached thereto.

7. The system set forth in claim 1, wherein said imaging system generates pixels of said light indicia from said current image and said controller executes said CNN on the pixels thereby identifying disposition of the component disposed upon the workpiece.

8. The system set forth in claim 1, wherein said light source is defined as a laser source and said light indicia is defined as a laser line generated by said laser source.

9. The system set forth in claim 1, wherein the component is a nail and the workpiece is a wood structure.

10. The system set forth in claim 1, wherein said light indicia projected over a component being properly affixed to the workpiece presents no indicia distortion and said light indicia projected over an improperly installed component presents indicia distortion.

11. The system set forth in claim 1, wherein said stored images in said AI element include images of a properly installed component and images of an improperly installed component including said light indicia defining disposition of each of said images.

12. The system set forth in claim 1, further including a laser projector being signaled by said controller disposition of the components and said laser projector scanning a laser icon onto the workpiece adjacent the component being indicative of the disposition of the component.

13. The system set forth in claim 1, further comprising a reference target being registered to the workpiece by the imager and location of the reference target being correlated to features defined by the workpiece.

14. The system set forth in claim 13, wherein the controller locates the workpiece within a common coordinate system with said light source, said imager and a laser projector from said reference target.

15. The system set forth in claim 14, wherein location of the workpiece within the common coordinate system monitored by images generated by said imaging system of features defined by the workpiece.

* * * * *